US010833975B2

(12) United States Patent
Pignataro et al.

(10) Patent No.: US 10,833,975 B2
(45) Date of Patent: Nov. 10, 2020

(54) OPERATIONS PROCESSING OF MULTIPLE-PROTOCOL PACKETS BY PACKET SWITCHING DEVICES IN A NETWORK

(71) Applicant: Cisco Technology, Inc., San Jose, CA (US)

(72) Inventors: Carlos M. Pignataro, Cary, NC (US); Frank Brockners, Cologne (DE); Shwetha Subray Bhandari, Bangalore (IN); Nagendra Kumar Nainar, Morrisville, NC (US)

(73) Assignee: Cisco Technology, Inc., San Jose, CA (US)

( * ) Notice: Subject to any disclaimer, the term of this patent is extended or adjusted under 35 U.S.C. 154(b) by 145 days.

(21) Appl. No.: 16/230,933

(22) Filed: Dec. 21, 2018

(65) Prior Publication Data

US 2020/0145321 A1 May 7, 2020

(30) Foreign Application Priority Data

Nov. 2, 2018 (IN) ............................ 201841041559

(51) Int. Cl.
*G06F 15/173* (2006.01)
*H04L 12/761* (2013.01)
(Continued)

(52) U.S. Cl.
CPC ............. *H04L 45/16* (2013.01); *H04L 45/04* (2013.01); *H04L 45/507* (2013.01); *H04L 45/64* (2013.01); *H04L 45/741* (2013.01)

(58) Field of Classification Search
CPC ......... H04L 45/16; H04L 45/04; H04L 45/64; H04L 45/741
See application file for complete search history.

(56) References Cited

U.S. PATENT DOCUMENTS

2003/0156548 A1* 8/2003 Sapp ...................... H04L 43/50 370/252
2016/0315819 A1 10/2016 Dara et al.
(Continued)

OTHER PUBLICATIONS

Deering et al., "Internet Protocol, Version 6 (IPv6) Specification," Dec. 1998, RFC 2460, The Internet Society, Reston, VA, USA (thirty-nine pages).
(Continued)

*Primary Examiner* — Thanh T Nguyen
(74) *Attorney, Agent, or Firm* — The Law Office of Kirk D. Williams

(57) ABSTRACT

In one embodiment, improved operations processing of multiple-protocol packets is performed by a node connected to a network. Received is a multiple-protocol (MP) packet that has multiple protocol headers, each having an operations data field. The operations data field of a first protocol header includes first protocol ordered operations data. Operations data is cohered from the operations data field of each of multiple protocol headers into the operations data field of a second protocol header resulting in the operations data field of the second protocol header including ordered MP operations data evidencing operations data of each of the multiple network nodes in a node traversal order taken by the MP packet among multiple network nodes. The ordered MP operations data includes said first protocol ordered operations data cohered from the operations data field of the first protocol header.

20 Claims, 8 Drawing Sheets

NETWORK 100
110
NETWORK
EXTERNAL CLIENT NETWORK WITH NODES
iOAM EDGE NODE
NODES (E.G., ROUTERS SWITCHES, APPLIANCES, HOSTS, NMS'S, OSS'S)
iOAM EDGE NODE
EXTERNAL CLIENT NETWORK WITH NODES
101 111 112 113 103

START 160
162 NETWORK NODES IN THE NETWORKS TYPICALLY CONTINUOUSLY ADVERTISE/EXCHANGE ROUTING/FORWARDING/CAPABILITY INFORMATION, OPERATIONS CAPABILITIES, ETC. (E.G., VIA ONE OR MORE ROUTING/LABEL DISTRIBUTION/DISCOVERY PROTOCOLS)
164 NETWORK NODES CONTINUOUSLY UPDATE THEIR NETWORK INFORMATION, SUCH AS, BUT NOT LIMITED TO, ROUTING INFORMATION BASES (RIBS), FORWARDING INFORMATION BASES (FIBS), FORWARDING TABLES, PACKET/NETWORK PROCESSING AND/OR CONTROL DATA STRUCTURES, OPERATIONS DATA STRUCTURES, ETC.
END 169

(51) Int. Cl.

| | |
|---|---|
| ***H04L 12/749*** | (2013.01) |
| ***H04L 12/723*** | (2013.01) |
| ***H04L 12/715*** | (2013.01) |

(56) References Cited

U.S. PATENT DOCUMENTS

2016/0315850 A1 10/2016 Dara et al.
2016/0315921 A1 10/2016 Dara et al.
2017/0005920 A1 1/2017 Previdi et al.
2017/0339072 A1* 11/2017 Pignataro ................ H04L 45/64
2020/0145321 A1* 5/2020 Pignataro ............ H04L 12/4633
2020/0145518 A1* 5/2020 Nainar .................... H04L 69/18

OTHER PUBLICATIONS

Deering et al., "Internet Protocol, Version 6 (IPv6) Specification," Jul. 2017, RFC 8200, The Internet Society, Reston, VA, USA (forty-two pages).
Carpenter et al., "Transmission and Processing of IPv6 Extension Headers," Dec. 2013, RFC 7045, The Internet Society, Reston, VA, USA (ten pages).
Elkins et al., "IPv6 Performance and Diagnostic Metrics (PDM) Destination Option," Sep. 2017, RFC 8250, The Internet Society, Reston, VA, USA (thirty pages).
Brockners et al., "Requirements for in-situ OAM," Mar. 13, 2017, draft-brockners-inband-oam-requirements-03, The Internet Society, Reston, VA, USA (twenty-four pages).
Brockners et al., "Data Fields for in-situ OAM," Jul. 2, 2017, draft-brockners-inband-oam-data-07, The Internet Society, Reston, VA, USA (twenty-nine pages).
Brockners et al., "Encapsulations for in-situ OAM Data," Jul. 2, 2017, draft-brockners-inband-oam-transport-05, The Internet Society, Reston, VA, USA (thirty pages).
Brockners et al., "Geneve encapsulation for in-situ OAM Data," Jun. 27, 2018, draft-brockners-ippm-ioam-geneve-01, The Internet Society, Reston, VA, USA (ten pages).
Brockners et al., "VXLAN-GPE Encapsulation for in-situ OAM Data," Jun. 27, 2018, draft-brockners-ippm-ioam-vxlan-gpe-01, The Internet Society, Reston, VA, USA (ten pages).
Brockners et al., "Data Fields for in-situ OAM," Oct. 30, 2017, draft-ietf-ippm-ioam-data-01, The Internet Society, Reston, VA, USA (twenty-nine pages).
Brockners et al., "Data Fields for in-situ OAM," Jun. 27, 2018, draft-ietf-ippm-ioam-data-03, The Internet Society, Reston, VA, USA (thirty-five pages).
Song and Zhou, "In-situ OAM Data Type Extension," Apr. 16, 2018, draft-song-ippm-ioam-data-extension-01, The Internet Society, Reston, VA, USA (seven pages).
Bhandari et al., "In-situ OAM IPv6 Options," Jun. 29, 2018, draft-ioametal-ippm-6man-ioam-ipv6-options-00, The Internet Society, Reston, VA, USA (nine pages).
Weis et al., "GRE Encapsulation for in-situ OAM Data," Mar. 3, 2018, draft-weis-ippm-ioam-gre-00, The Internet Society, Reston, VA, USA (nine pages).
Ali et al., "Operations, Administration, and Maintenance (OAM) in Segment Routing Networks with IPv6 Data plane (SRv6)," Jul. 2, 2018, draft-ali-spring-srv6-oam-01.txt, The Internet Society, Reston, VA, USA (twenty-eight pages).
Previdi et al., "IPv6 Segment Routing Header (SRH)," Mar. 13, 2017, draft-ietf-6man-segment-routing-header-06, The Internet Society, Reston, VA, USA (thirty-five pages).
Baker and Bonica, "IPv6 Hop-by-Hop Options Extension Header," Mar. 16, 2016, draft-ietf-6man-hbh-header-handling-03, The Internet Society, Reston, VA, USA (ten pages).
Filsfils et al, "IPv6 Segment Routing Header (SRH)," Jun. 28, 2018, draft-ietf-6man-segment-routing-header-14, The Internet Society, Reston, VA, USA (twenty-nine pages).
"In-band OAM for IPv6," IPv6 Network Management Configuration Guide, Cisco IOS Release 15M&T, Jan. 26, 2018, Cisco Systems, Inc., San Jose, CA (thirty-six pages).
IPv6 Network Management Configuration Guide, Cisco IOS Release 15M&T, Nov. 21, 2012, Cisco Systems, Inc., San Jose, CA (ninety-six pages).
"Encapsulation Techniques: Generic Network Virtualization Encapsulation, VXLAN Generic Protocol Extension, and Network Service Header," White Paper, 2014, Cisco Systems, Inc., San Jose, CA (three pages).
Tom Herbert, "Re: [nvo3] [ippm] [Int-area] encapsulation of IAAM data in various protocols—follow up from WG discussion in London," Apr. 12, 2018, www.mail-archive.com/nvo3@ietf.org/msg05579.html, The Internet Society, Reston, VA, USA (six pages).
Mahalingam et al., "Virtual eXtensible Local Area Network (VXLAN): A Framework for Overlaying Virtualized Layer 2 Networks over Layer 3 Networks," Aug. 2014, RFC 7348, The Internet Society, Reston, VA, USA (twenty-two pages).
Sajassi et al., "BGP MPLS-Based Ethernet VPN," Feb. 2015, RFC 7432, The Internet Society, Reston, VA, USA (fifty-six pages).
J. Touch, "Recommendations on Using Assigned Transport Port Numbers," Aug. 2015, RFC 7605, The Internet Society, Reston, VA, USA (twenty-four pages).
Maino et al., "Generic Protocol Extension for VXLAN," Apr. 30, 2018, draft-ietf-nvo3-vxlan-gpe-06, The Internet Society, Reston, VA, USA (seventeen pages).
"Cisco Data Center Spine-and-Leaf Architecture: Design Overview," White Paper, 2016, Cisco Systems, Inc., San Jose, CA (twenty-seven pages).
Halpern and Pignataro, "Service Function Chaining (SFC) Architecture," Oct. 2015, RFC 7665, The Internet Society, Reston, VA, USA (thirty-two pages).
Quinn et al., "Network Service Header (NSH)," Jan. 2018, Jan. 2018, RFC 8300, The Internet Society, Reston, VA, USA (forty pages).
Guichard et al., "NSH and Segment Routing Integration for Service Function Chaining (SFC)," Jun. 18, 2018, draft-guichard-sfc-nsh-sr-02, The Internet Society, Reston, VA, USA (fifteen pages).
Kumar et al., "Service Function Simple Offloads," Apr. 2, 2017, draft-ietf-sfc-offloads-00, The Internet Society, Reston, VA, USA (seventeen pages).
"Internet Protocol," Sep. 1981, RFC 791, The Internet Society, Reston, VA, USA (forty-five pages).
Farinacci et al., "Generic Routing Encapsulation (GRE)," Mar. 2000, RFC 2784, The Internet Society, Reston, VA, USA (nine pages).
Brockners et al., "Proof of Transit," Oct. 30, 2016, draft-brockners-proof-of-transit-02, The Internet Society, Reston, VA, USA (twenty-three pages).
Brockners et al., "Proof of Transit," May 7, 2018, draft-brockners-proof-of-transit-05, The Internet Society, Reston, VA, USA (twenty-three pages).
Brockners et al., "Proof of Transit," Oct. 1, 2018, draft-ietf-sfc-proof-of-transit-01, The Internet Society, Reston, VA, USA (twenty-five pages).
PCT International Search Report and Written Opinion, PCT Application PCT/US2019/058593, ISA/EP, European Patent Office, Netherlands, dated Apr. 2, 2020 (twelve pages).

* cited by examiner

PACKET PROCESSING BY AN OPERATIONS DOMAIN INGRESS EDGE NODE

PACKET PROCESSING BY A CORE OPERATIONS DOMAIN NODE

PACKET PROCESSING BY AN EGRESS EDGE OPERATIONS DOMAIN NODE

OPERATIONS PROCESSING OF MULTIPLE-PROTOCOL PACKETS BY PACKET SWITCHING DEVICES IN A NETWORK

TECHNICAL FIELD

The present disclosure relates generally to packet switching network communications, including, but not limited to, improved operations processing of multiple-protocol packets by packet switching devices in a network.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology in packet switching networks of various topologies.

BRIEF DESCRIPTION OF THE DRAWINGS

The appended claims set forth the features of one or more embodiments with particularity. The embodiment(s), together with its advantages, may be understood from the following detailed description taken in conjunction with the accompanying drawings of which:

DESCRIPTION OF EXAMPLE EMBODIMENTS

1. Overview

Figure 1A:
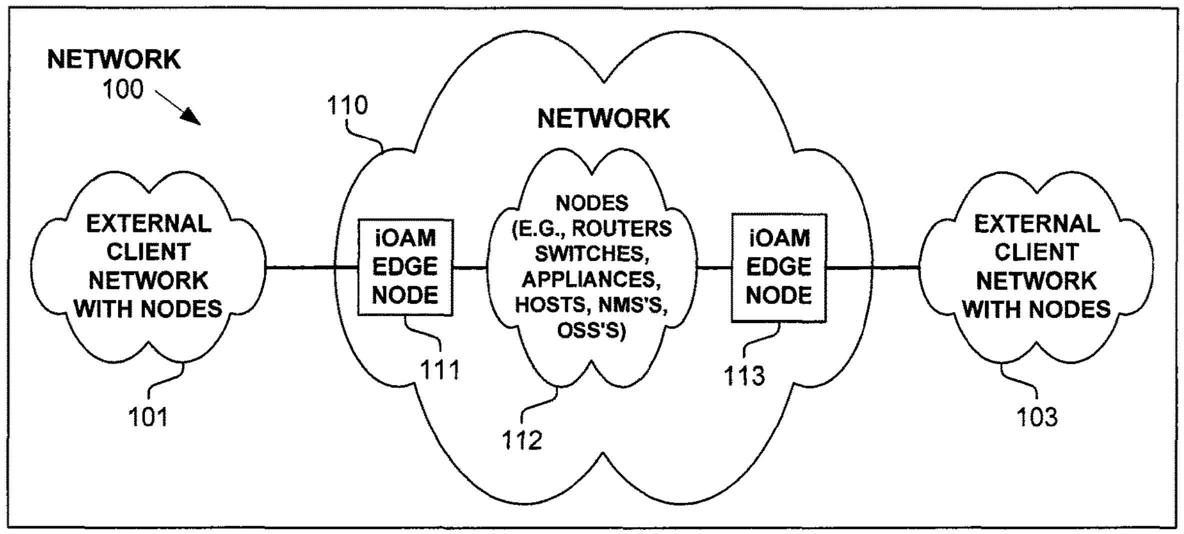
FIG. 1A illustrates a network operating according to one embodiment.

Disclosed are, inter alia, methods, apparatus, computer-storage media, mechanisms, and means associated with improved operations processing of multiple-protocol packets by packet switching devices in a network.

In one embodiment, a particular multiple-protocol (MP) packet is received by a particular network node in a network. The network includes multiple network nodes including the particular network node. The particular MP packet includes multiple protocol headers, with each of the protocol headers including an operations data field. These multiple protocol headers include a first protocol header and a second protocol header. The operations data field of the first protocol header of the received packet includes first protocol ordered operations data, but is not included in the second protocol header. Operations data is cohered from the operations data field of each of the multiple protocol headers into the operations data field of the second protocol header resulting in the operations data field of the second protocol header including ordered MP operations data, with said ordered MP operations data evidencing operations data of each of the multiple network nodes in a node traversal order taken by the particular MP packet among the plurality of network nodes, and with said ordered MP operations data including said first protocol ordered operations data. The particular network node sends into the network the particular MP packet that includes said ordered MP operations data in the second protocol header.

In one embodiment, the particular network node includes one or more processing elements; memory; and one or more interfaces that send and receive packets.

In one embodiment, the multiple protocol headers includes a third protocol header when the particular MP packet is said received by the particular network node, with the operations data field of the third protocol header including third protocol ordered operations data. In one embodiment, when sent from the particular network node: the operations data field of the first protocol header does not include said first protocol ordered operations data, and the operations data field of the third protocol header does not include said third protocol ordered operations data.

In one embodiment, said first protocol ordered operations data evidences operations data of at least two of the plurality of network nodes when the particular MP packet is received by the particular network node.

In one embodiment, the network comprises an overlay network that includes the particular network node; wherein the network comprises an underlay network that includes the first network node. In one embodiment, the first protocol header corresponds to the underlay network. In one embodiment, the second protocol header corresponds to the overlay network.

In one embodiment, the first protocol header corresponds to an underlay protocol, and the second protocol header corresponds to an overlay protocol.

In one embodiment, the first protocol header is an Internet Protocol version 6 (IPv6) Header, and the second protocol header is an IPv6 extension header. In one embodiment, the second protocol header is a Segment Routing Header (SRv6).

2. Example Embodiments

Disclosed are, inter alia, methods, apparatus, computer-storage media, mechanisms, and means associated with improved operations processing of multiple-protocol packets by packet switching devices in a network. Embodiments described herein include various elements and limitations, with no one element or limitation contemplated as being a critical element or limitation. Each of the claims individually recites an aspect of the embodiment in its entirety. Moreover, some embodiments described may include, but are not limited to, inter alia, systems, networks, integrated circuit chips, embedded processing elements, ASICs, methods, and computer-readable media containing instructions. One or multiple systems, devices, components, etc., may comprise one or more embodiments, which may include some elements or limitations of a claim being performed by the same or different systems, devices, components, etc. A processing element may be a general processor, task-specific processor, a core of one or more processors, or other co-located, resource-sharing implementation for performing the corresponding processing. The embodiments described hereinafter embody various aspects and configurations, with the figures illustrating exemplary and non-limiting configurations. Computer-readable media and means for performing methods and processing block operations (e.g., a processor and memory or other apparatus configured to perform such operations) are disclosed and are in keeping with the extensible scope of the embodiments. The term "apparatus" is used consistently herein with its common definition of an appliance or device.

The steps, connections, and processing of signals and information illustrated in the figures, including, but not limited to, any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation). Also, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc., are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Finally, the term "particular machine," when recited in a method claim for performing steps, refers to a particular machine within the 35 USC § 101 machine statutory class.

As used herein, a "data packet" refers to a standard packet communicating information (such as a customer data packet), with a probe packet (e.g., test packet) not being included in the definition of a data packet.

As used herein, "operations data" refers to operations, administration, maintenance (OAM) and/or provisioning (OAM-P) information (e.g., including operational and telemetry information), such as, but not limited to, in-band OAM data, or more specifically, In-Situ OAM Data. In one embodiment, the operations data is raw data, processed data, and/or data resulting from processing of other information.

In one embodiment, the operations data is related to data-plane and/or control-plane processing in the network (e.g., in a portion of, or the entire network). In one embodiment, the operations data is related to communication (including, but not limited to, verifying and/or discovering a path taken and/or performance measurement data or results) and/or other processing of packet(s) in a network. In one embodiment, the operations data is related to process(es), hardware, link(s), and/or other resources of one or more elements in the network (e.g., node(s), router(s), packet switching device(s), network management or other control system(s), host(s), server(s), apparatus, application processor(s), service devices(s), application processor(s), transmission and/or communications equipment). In one embodiment, operations data includes information related to the communication of a packet through a network, other protocol layer processing, and/or same layer processing.

In one embodiment, the operations data encompasses data related to one or more underlay protocols/networks. In one embodiment, the operations data encompasses data related to one or more overlay protocols/networks.

In one embodiment, operations data is cohered from both underlay and overlay protocols/networks. As used herein, the term "cohere" refers to forming a united and orderly consistent whole. Thus, as used herein, cohering operations data from an operations data field of multiple protocol headers refers to combining operations data from the operations data field of each of the of the multiple protocol headers. Further, when the context (e.g., type of operations data) requires identifying an ordering between or among at least some of the operations data being combined from the multiple operations data fields, cohering of the operations data provides indication(s) of such ordering. In one embodiment, the order that operations data is stored in an operations data identifies an order (e.g., the operations data field stores a list, in contrast to a set).

FIG. 1A illustrates a network 100 (e.g., an aggregation of one or more networks of one or more different entities) operating using multiple protocol layers in processing packets (e.g., using overlay and underlay protocols/networks) according to one embodiment. As shown, network 100 includes client networks 101 and 103 (which are the same network in one embodiment) communicatively coupled to a provider network 110. In one embodiment, network 110 uses Segment Routing (SR), Multiprotocol Label Switching (MPLS), tunnels, Ethernet VPN (EVPN), Provider Backbone Bridging EVPN (PBB-EVPN), Internet Protocol version 4 and/or 6 (IP), and/or other encapsulating and/or packet forwarding technology.

In one embodiment, provider network 110 includes provider edge nodes 111 and 113, and a network 112 of network nodes, gateways, service functions, hosts (e.g., end nodes), network management, operations support systems, etc. In one embodiment, provider edge nodes 111 and 113 process packets received from networks 101 and 103, which may include encapsulating or otherwise processing these packets into Segment Routing packets such as by adding a SR header (and possibly another IP header) to these packets according to a data plane ascertained Segment Routing policy, and subsequently decapsulating or removing a Segment Routing header (and possibly another IP header) and forwarding the native (e.g., IP) packets into network 101 and 103. In one embodiment, edge nodes 111 and 113 perform ingress and egress processing of packets, including adding and extracting operations data fields and operations data to packets.

Figure 1B:
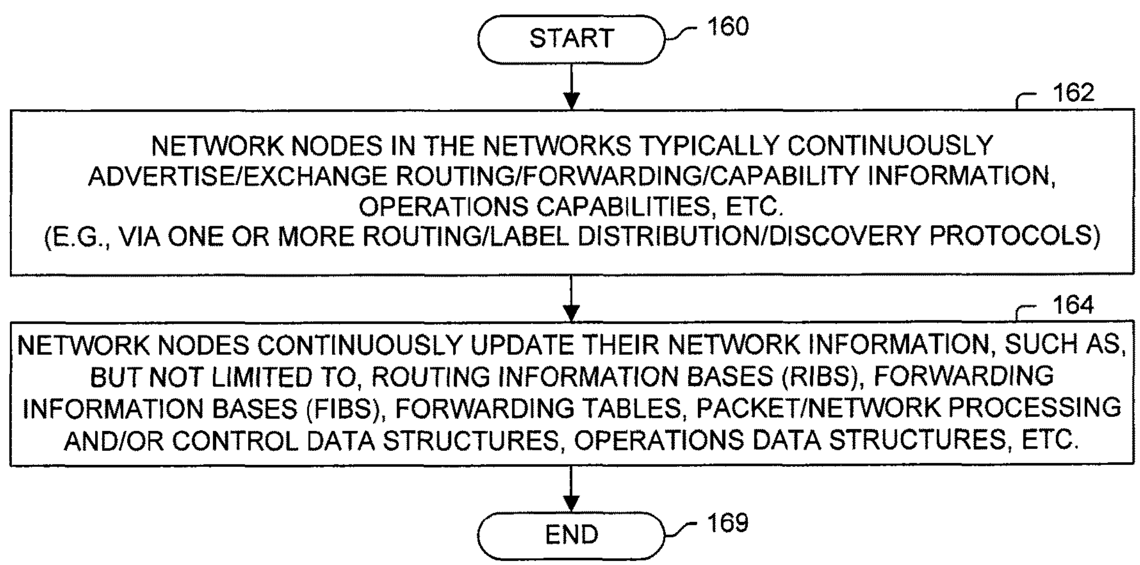
FIG. 1B illustrates a process according to one embodiment.

FIG. 1B illustrates a process according to one embodiment associated with improved operations processing of multiple-protocol packets by packet switching devices in a network. Processing begins with process block 160. In process block 162, network nodes in the networks typically continuously advertise/exchange routing, forwarding, capability and information (e.g., including operations capabilities), etc., via one or more routing, label distribution, discovery, signaling and/or other control-plane protocols. In process block 164, the network nodes continuously update their network information, such as, but not limited to, Routing Information Bases (RIBs), Forwarding Information Bases (FIBS), forwarding tables, packet/network processing and/or control data structures, operations data structures, etc. Processing of the flow diagram of FIG. 1B is complete as indicated by process block 169.

Figure 2A:
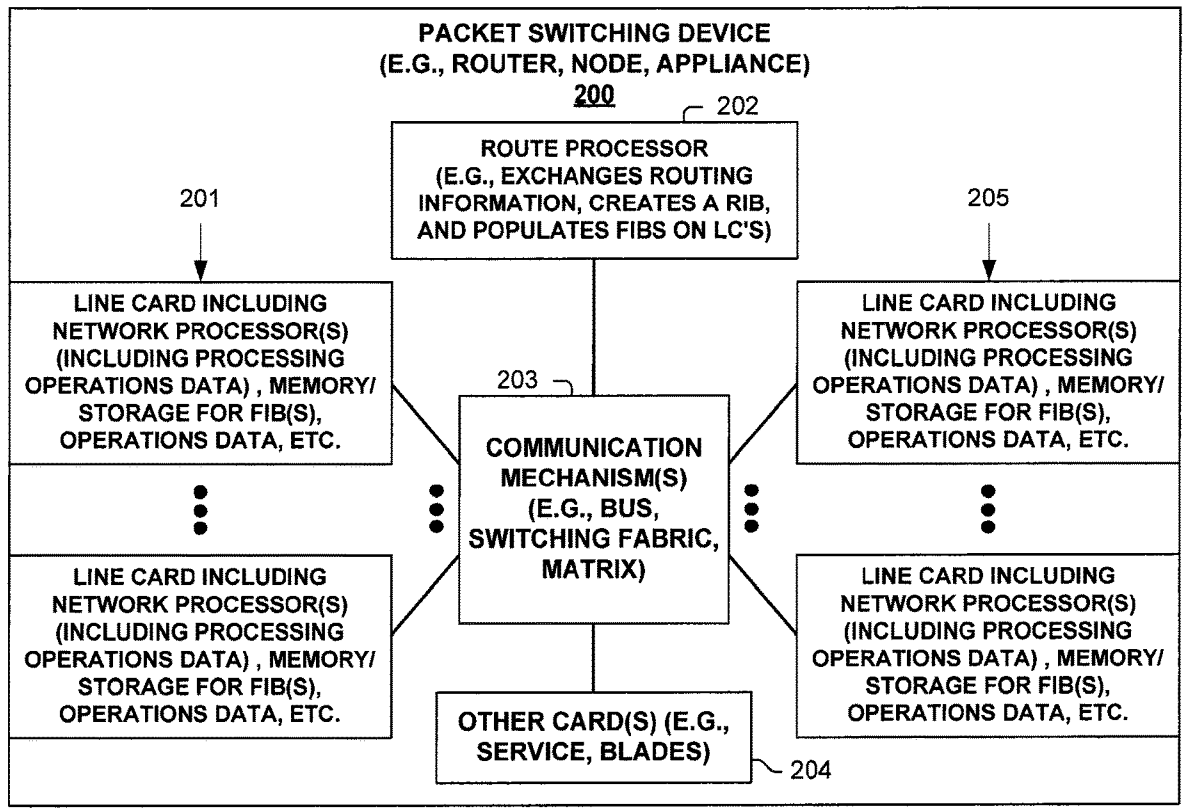
FIG. 2A illustrates a packet switching device according to one embodiment.
Figure 2B:
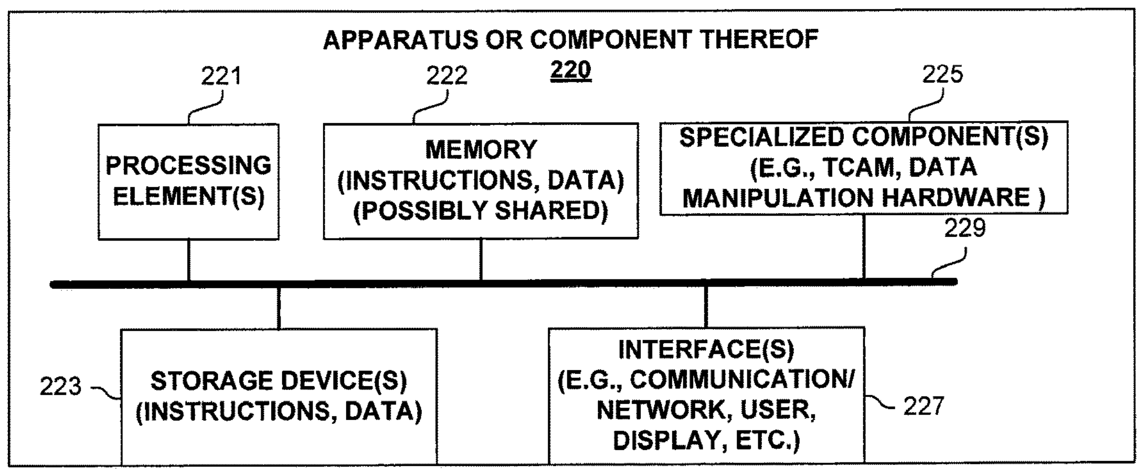
FIG. 2B illustrates an apparatus or component thereof according to one embodiment.

FIGS. 2A-B and their discussion herein provide a description of various network nodes according to one embodiment.

FIG. 2A illustrates one embodiment of a packet switching device 200 (e.g., router, node, switching, appliance, gateway) according to one embodiment. As shown, packet switching device 200 includes multiple line cards 201 and 205, each with one or more network interfaces for sending and receiving packets over communications links (e.g., possibly part of a link aggregation group), and with one or more processing elements that are used in one embodiment associated with improved operations processing of multiple-protocol packets by packet switching devices in a network. Packet switching device 200 also has a control plane with one or more processing elements (e.g., Route Processor(s)) 202 for managing the control plane and/or control plane processing of packets associated with improved operations processing of multiple-protocol packets by packet switching devices in a network. Packet switching device 200 also includes other cards 204 (e.g., service cards, blades) which include processing elements that are used in one embodiment to process (e.g., forward/send, drop, manipulate, change, modify, receive, create, duplicate, perform operations data processing functionality, apply a service according to one or more service functions) packets associated with improved operations processing of multiple-protocol packets by packet switching devices in a network, and some hardware-based communication mechanism 203 (e.g., bus, switching fabric, and/or matrix, etc.) for allowing its different entities 201, 202, 204 and 205 to communicate. Line cards 201 and 205 typically perform the actions of being both an ingress and egress line card, in regards to multiple other particular packets and/or packet streams being received by, or sent from, packet switching device 200. In one embodiment, operations data processing and storage functions are implemented on line cards 201, 205.

FIG. 2B is a block diagram of an apparatus 220 (e.g., host, router, node, destination, or portion thereof) used in one embodiment associated with improved operations processing of multiple-protocol packets by packet switching devices in a network. In one embodiment, apparatus 220 performs one or more processes, or portions thereof, corresponding to one of the flow diagrams illustrated or otherwise described herein, and/or illustrated in another diagram or otherwise described herein.

In one embodiment, apparatus 220 includes one or more processor(s) 221 (typically with on-chip memory), memory 222 (possibly shared memory), storage device(s) 223, specialized component(s) 225 (e.g. optimized hardware such as for performing lookup, packet processing (including Segment Routing processing) and/or service function operations; associative memory; binary and/or ternary content-addressable memory; Application Specific Integrated Circuit(s), cryptographic hash hardware, etc.), and interface(s) 227 for communicating information (e.g., sending and receiving packets, user-interfaces, displaying information, etc.), which are typically communicatively coupled via one or more communications mechanisms 229 (e.g., bus, links, switching fabric, matrix), with the communications paths typically tailored to meet the needs of a particular application.

Various embodiments of apparatus 220 may include more or fewer elements. The operation of apparatus 220 is typically controlled by processor(s) 221 using memory 222 and storage device(s) 223 to perform one or more tasks or processes. Memory 222 is one type of computer-readable/computer-storage medium, and typically comprises random access memory (RAM), read only memory (ROM), flash memory, integrated circuits, and/or other memory components. Memory 222 typically stores computer-executable instructions to be executed by processor(s) 221 and/or data which is manipulated by processor(s) 221 for implementing functionality in accordance with an embodiment. Storage device(s) 223 are another type of computer-readable medium, and typically comprise solid state storage media, disk drives, diskettes, networked services, tape drives, and other storage devices. Storage device(s) 223 typically store computer-executable instructions to be executed by processor(s) 221 and/or data which is manipulated by processor(s) 221 for implementing functionality in accordance with an embodiment.

Figure 3A:
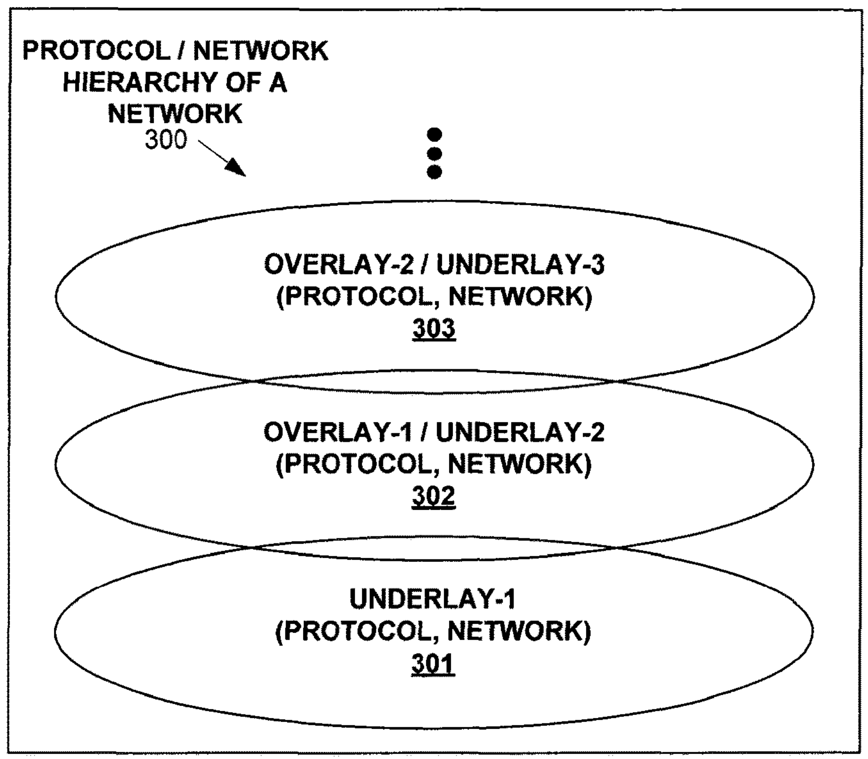
FIG. 3A illustrates a protocol/network hierarchy according to one embodiment.

FIG. 3A illustrates a hierarchical nature of a network 300 operating according to one embodiment. This hierarchal nature can be viewed in terms of the related entities of: overlay and underlay networks; and overlay and underlay protocol layers represented in headers included in a packet.

Overlay and underlay are relative terms. In one embodiment, a first (underlay) protocol/network (301) is viewed in relation to a second (overlay) protocol/network (302). One embodiment additionally includes a third (overlay) protocol/network (303) such that the second protocol/network (302) is an underlay to the third protocol/network (303), while remaining to be an overlay to the first protocol/network (301).

One embodiment includes any protocol/network associated with the Open Standards Interconnection (OSI) model, and may include multiple protocols/networks from a same Layer of the OSI model.

One embodiment is used in conjunction with, but not limited to, a physical transport network (e.g., optical switches and devices, facilities), a networking transport network (e.g., switches, routers), and a service chaining network (e.g., service nodes, which as shown includes also network management and operations support systems in one embodiment). One embodiment is used in conjunction with, but not limited to, multiple protocols associated with same and/or different OSI layers.

In one embodiment, network 300 uses Segment Routing (SR), Multiprotocol Label Switching (MPLS), various tunneling protocols, Ethernet VPN (EVPN), Provider Backbone Bridging EVPN (PBB-EVPN), Internet Protocol version 4 and/or 6 (IP), Ethernet and/or other encapsulating and/or forwarding protocols.

Correspondingly, one embodiment acquires correlated operations data by adding operations data to operations data fields of different protocol headers of a multiple-protocol (MP) packet as it traverses a network, as well as cohering operations data from a protocol header into a different protocol header at various points during this network traversal.

Figure 3B:
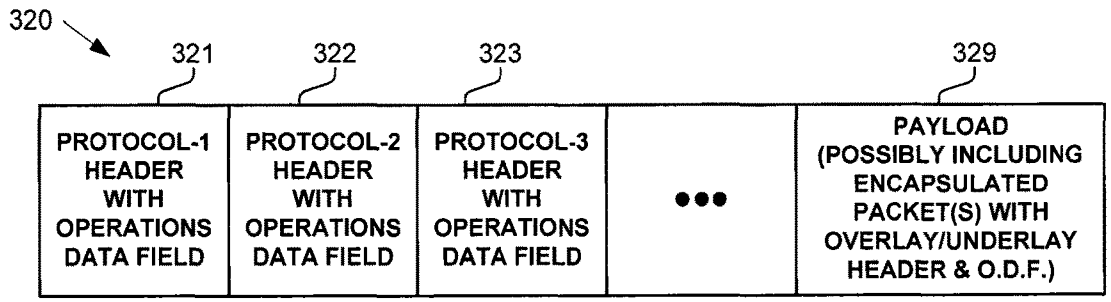
FIG. 3B illustrates a multiple-protocol (MP) packet according to one embodiment.

FIG. 3B illustrates a multiple-protocol (MP) packet 320 according to one embodiment. As shown, MP packet 320 includes multiple headers 321-323, each with an operations data field for receiving operations data added by corresponding protocol layer processing. MP packet 320 also includes payload 329, which may include an encapsulated packet that has one or more headers. In one embodiment, operations data is only added and cohered from two or more headers 321-323 of MP packet 320 that are outside payload 329. In one embodiment, operations data is added and cohered from one or more headers 321-323 of MP packet 320 as well as one or more headers of an encapsulated packet inside payload 329.

A problem with a prior approach is that the operations data from each header of a packet was maintained independently within the packet. Thus, a packet did not directly indicated an ordering of the operations data of various underlay and overlay protocols/networks. To achieve improved operations processing of multiple-protocol packets by packet switching devices in a network, one embodiment coheres operations data within the MP packet as it traverses underlay and overlay networks/protocols. In one embodiment, operations data is cohered from an underlay network/protocol to operations data of an overlay network/protocol. In one embodiment, operations data is cohered from an overlay network/protocol to operations data of an underlay network/protocol.

Figure 4A:
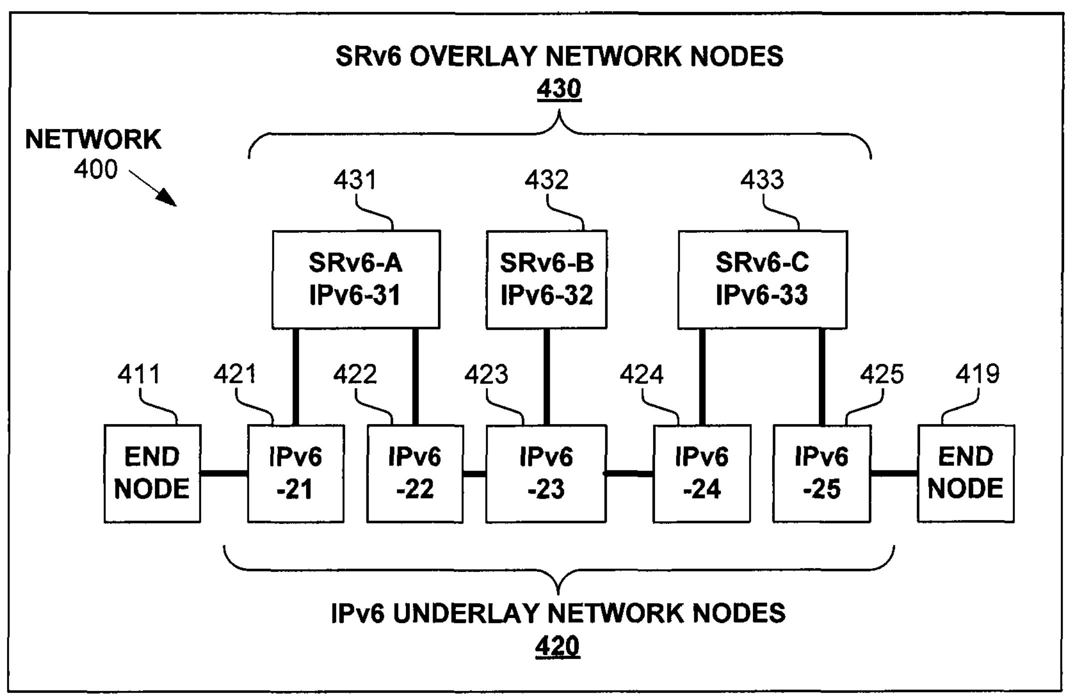
FIG. 4A illustrates a network operating according to one embodiment.

FIG. 4A illustrates a network 400 operating according to one embodiment. As shown, network 400 includes end nodes 411 and 419; Internet Protocol version 6 (IPv6) underlay network (420) nodes 421-425; and Segment Routing over IPv6 (SRv6) network (430) nodes 431-433. In network 400, IPv6 underlay network nodes 421-425 do not perform SRv6 processing of an MP packet; while SRv6 overlay network nodes 431-433 perform both IPv6 and SRv6 processing. In one embodiment, the operations data field corresponds to a type-length-value (TLV) in a Network Services Header (NSH).

In FIG. 4A, each of IPv6 nodes 421-425 is labeled with a corresponding unique IPv6 operations data value ranging from twenty-one to twenty-five. Additionally, each of SRv6 overlay network nodes 431-433 is labeled with both a corresponding unique IPv6 (underlay network 420) operations data value ranging from thirty-one to thirty-three, and a corresponding unique SRv6 (overlay network 430) operations data value ranging from “A” to “C.”

Figure 4B:
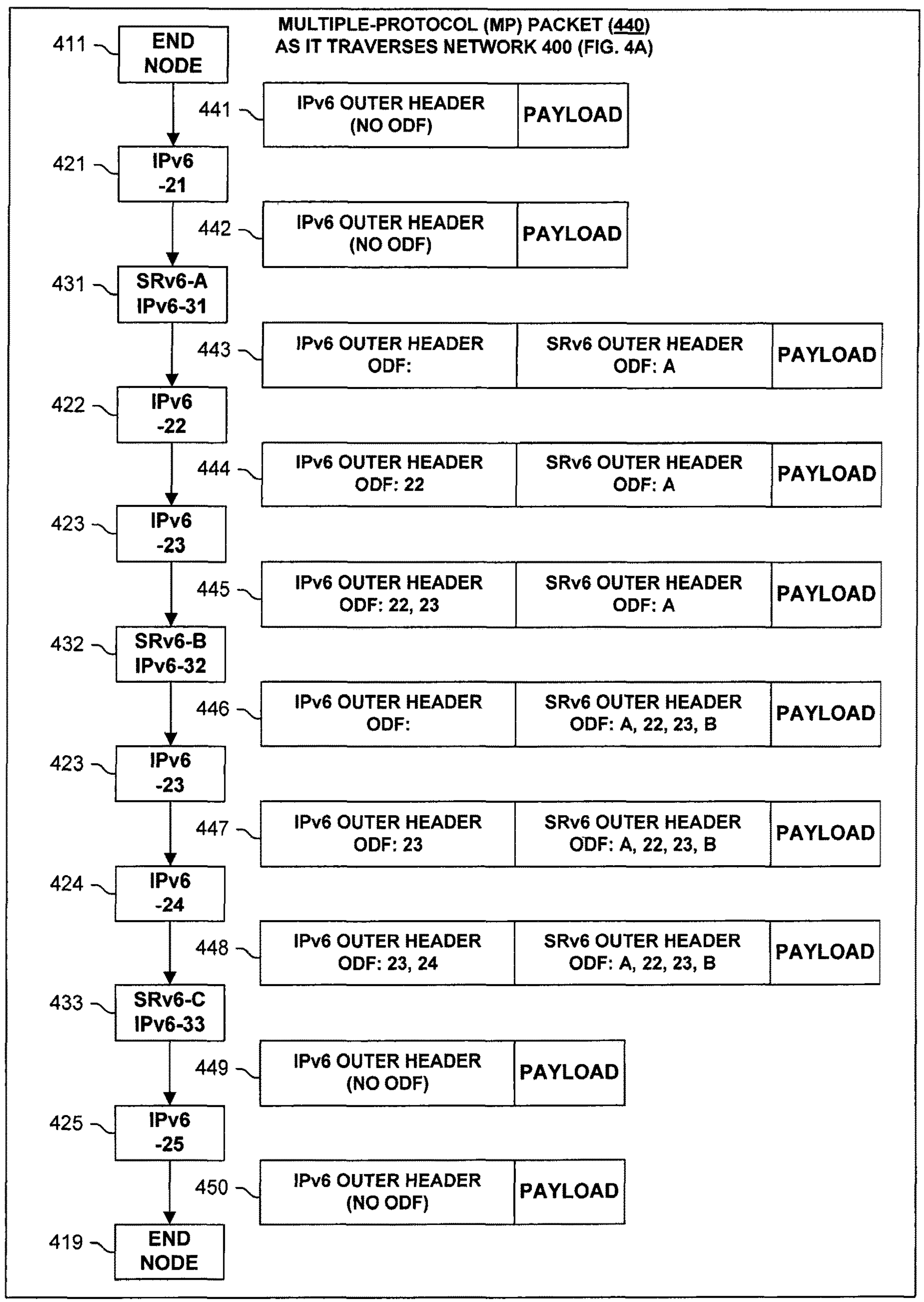
FIG. 4B illustrates a network operating according to one embodiment.

FIG. 4B illustrates the path (shown on the left-side, going from top of the page down) of an MP packet (440) as it traverses network 400 (of FIG. 4A). A corresponding Segment Routing Policy is applied by SRv6 node 431, with routing and forwarding tables of nodes 421-425 configured to cause the traversal of MP 440 through network 400 as shown in FIG. 4B. Note, MP packet 440 is denoted also using reference numbers 441-450 for description purposes, but is still considered as being a same packet 440 traversing network 400.

As shown, end node 411 sends MP packet 441 to underlay network node 421. MP packet 441 includes an IPv6 outer header with no operations data field (“ODF”).

Underlay network node 421 processes received packet 441, including by sending MP packet 442 to overlay network node 431. MP packet 442 includes the IPv6 outer header with no operations data field.

Overlay network node 431 processes received packet 442, including by adding a Segment Routing Policy (e.g., adds an SRv6 outer header) to send packet 440 through overlay (SRv6) network (430) nodes 432 and 433 via underlay network 420; and while collecting overlay network (430) and underlay network (420) path information. According to the Segment Routing Policy, node 431 adds to the IPv6 outer header an operations data field indicating subsequent IPv6 processing (e.g., by non-SRv6 nodes of overlay network 430) to collect underlay network path information (e.g., an IPv6 Hop-by-Hop option). In one embodiment, performance and/or other operations data is also designated to be collected in the operations data field of the IPv6 outer header and/or SRv6 outer header. Additionally, the added SRv6 outer Segment Routing Header includes an operations data field: specifying a path traversal list consisting of the single element of its unique SRv6 (overlay network 430) operations data value of “A” and designating to collect overlay path information and to cohere operations data collected from underlay network processing of MP packet 440. This processing of received packet 442 by node 431 results in the sending of MP packet 443 to node 422.

Underlay network node 422 processes received packet 443, including by adding its IPv6 unique underlay label of twenty-two to the end of the path information list (previously null) in the ODF of the IPv6 outer header. This processing of received packet 443 by node 422 results in the sending of MP packet 444 to node 423.

Underlay network node 423 processes received packet 444 including by appending its IPv6 unique underlay label of twenty-three to the end of the path information list (previously having the one element of twenty-two) in the ODF of the IPv6 outer header. This processing of received packet 444 by node 423 results in the sending of MP packet 445 to node 432.

Overlay network node 432 processes received packet 445, that includes cohering current underlay operations data from the ODF of the IPv6 outer header by extracting and appending it to the ordered list of overlay operations data in the SRv6 outer header and appending its unique SRv6 (overlay network 430) operations data value of “B” to the end of the ordered list of overlay operations data (which now also contains underlay operations data) as shown in packet 446. In one embodiment, this processing removes the current underlay operations data from the ODF of the IPv6 outer header. In one embodiment, this processing leaves the current underlay operations data in the ODF of the IPv6 outer header. In one embodiment, packet 446 includes the IPv6 unique underlay label of thirty-two of node 432 added to an ODF field. In one embodiment, the processing of received packet 445 by node 432 results in the sending of MP packet 446 to node 423 (per the forwarding path of network 400 as shown in FIG. 4A).

Underlay network node 423 processes received packet 446 including by appending its IPv6 unique underlay label of twenty-three to the end of the path information list (previously null) in the ODF of the IPv6 outer header. This processing of received packet 446 by node 423 results in the sending of MP packet 447 to node 424.

Underlay network node 424 processes received packet 447 including by appending its IPv6 unique underlay label of twenty-four to the end of the path information list (previously the single element of twenty-three) in the ODF of the IPv6 outer header. This processing of received packet 447 by node 424 results in the sending of MP packet 448 to node 433.

Overlay network node 433 processes received packet 448, that includes cohering current underlay operations data from the ODF of the IPv6 outer header by extracting and appending it to the ordered list of overlay operations data in the SRv6 outer header and appending its unique SRv6 (overlay network 430) operations data value of "C" to the end of the ordered list of overlay operations data. Thus, the underlay and overlay operations data results in the ordered list of: "A, 22, 23, B, 23, 24, C." The Segment Routing processing of the Segment Routing Policy of packet 440 also specifies for overlay network node 433 to remove the SRv6 outer header from received packet 448 and the ODF from the IPv6 outer header. This processing of received packet 448 by node 433 results in the sending of MP packet 449 to node 425. Overlay network (430) node 433 stores and processes the collected cohered overlay/underlay operations data, possibly including sending the cohered operations data to another node (e.g., network management system, operations support system). In one embodiment, this cohered operations data is used, including, but not limited to, for troubleshooting, planning, and underlay/overlay network traversal path, service chain verification, etc.

Underlay network node 425 processes received packet 449, including by sending packet 450 to end node 419.

In one embodiment, the ordered list of collected underlay and/or overlay operations data includes Node Segment Identifiers (Node-SIDs), Node service set identifiers (SSID), timestamps, ingress and/or egress interface identifiers, node or service identifiers, tenant identifiers, share of a secret describing an underlay or overlay network node, sequence number, delay metrics, loss metrics, metrics related to a node or link, and/or generic application metadata. In one embodiment, underlay and overlay nodes selectively insert corresponding operations data. In one embodiment, operations data is added at every corresponding underlay and overlay network node.

In one embodiment, both underlay and overlay operations data is added by a network node that performs both underlay and overlay protocol processing. In one embodiment, underlay and/or overlay protocol processing operations data is added to a MP packet once by a node. In one embodiment, underlay and/or overlay protocol processing operations data is added to an MP packet more than once by a node, such as, but not limited to, being responsive to ingress, egress, service blade, and/or other underlay and/or overlay protocol processing of the MP packet by the node.

Figure 5A:
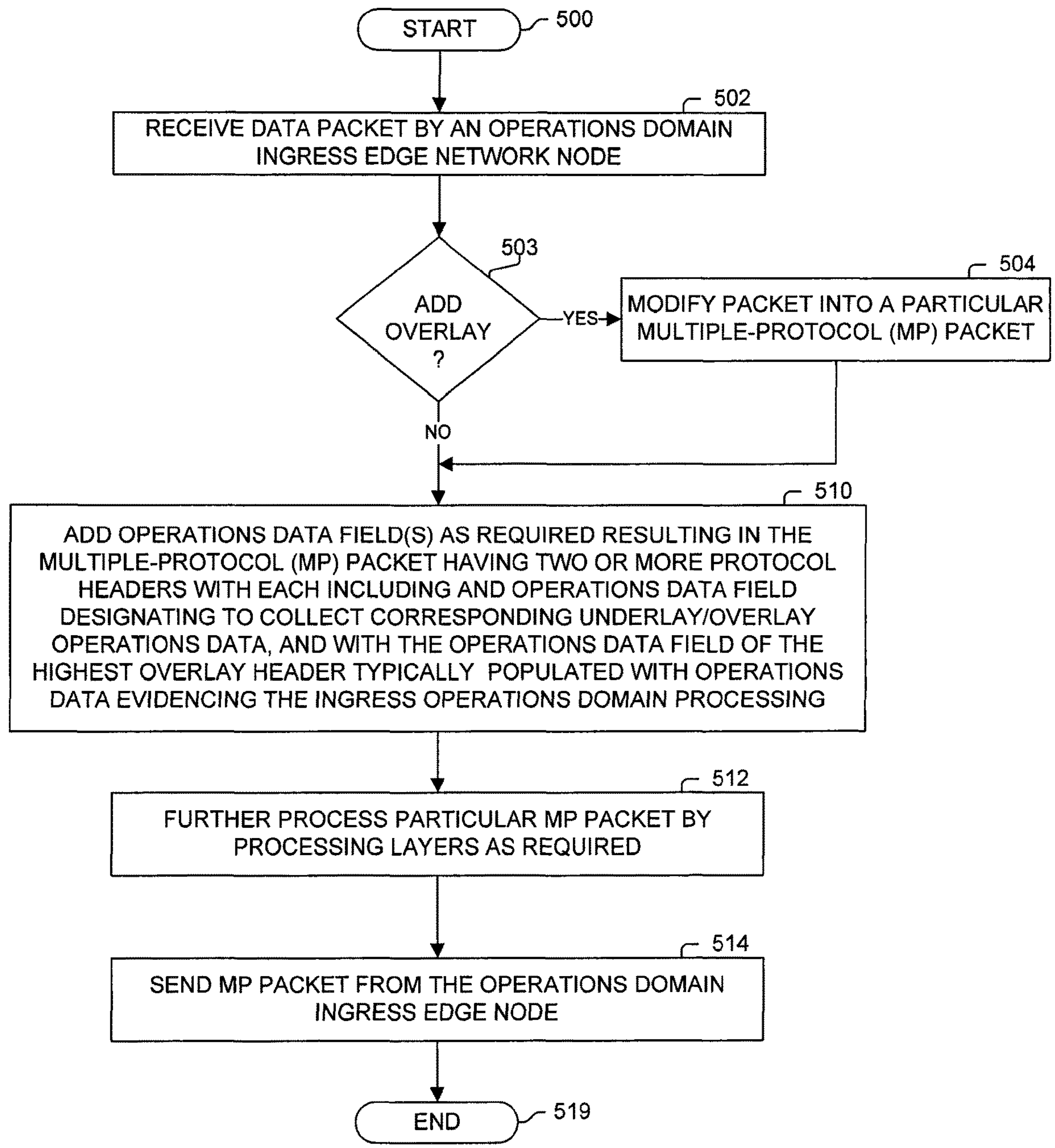
FIG. 5A illustrates a process according to one embodiment.

FIG. 5A illustrates a process performed in one embodiment by an ingress edge node of an operations domain. Processing begins with process block 500. In process block 502, a data (or probe) packet is received by an ingress edge node of an operations domain. As determined in process block 503, if the packet is to be transmitted through an overlay network for which it is currently does not have a corresponding overlay protocol header, then processing proceeds to process block 504; else processing proceeds directly to process block 510.

In process block 504, the received packet is modified by adding a corresponding overlay header and other corresponding overlay network processing. Processing proceeds to process block 510.

In process block 510, operations data field(s) are added by the operations data ingress edge node as required resulting in the multiple-protocol (MP) packet having two or more protocol headers, each including an operations data field designating to collect corresponding underlay/overlay operations data. The operations data field of the highest overlay header is typically populated with operations data evidencing the ingress operations domain processing.

In process block 512, the particular MP packet is further processed by the underlay/overlay processing layers as required. In process block 514, the MP packet is sent from the operations domain ingress edge node into the network. Processing of the flow diagram of FIG. 5A is complete as indicated by process block 519.

Figure 5B:
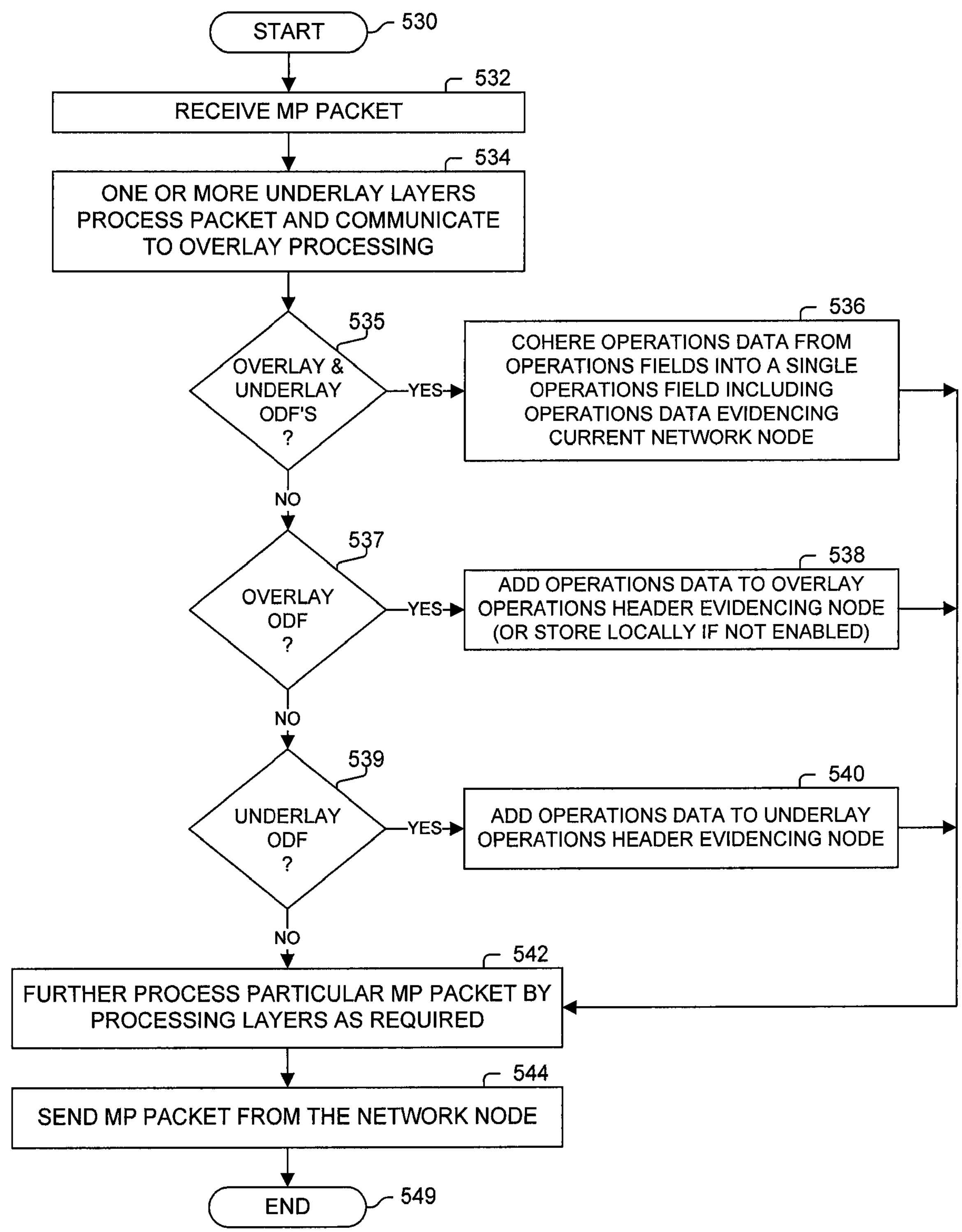
FIG. 5B illustrates a process according to one embodiment.

FIG. 5B illustrates a process performed in one embodiment by a core-network operations domain node. Processing begins with process block 530. In process block 532, an MP packet is received by the core-network operations domain node. In process block 534, the received MP packet is processed by one or more underlay layers and communicated to overlay network processing.

As determined in process block 535, if the received MP packet includes both overlay and underlay operations data field in which corresponding operations data is to be collected, then processing proceeds to process block 536; else processing proceeds to process block 537.

In process block 536, operations data is cohered from operations fields into a single operations field of an overlay or underlay header (e.g., the highest overlay header) including operations data evidencing the current network node. Processing proceeds to process block 542.

As determined in process block 537, if there is only a single operations data field, that being in an overlay header of the MP packet, then processing proceeds to process block 538; else processing proceeds to process block 539.

In process block 538, operations data is added to overlay operations header evidencing the current network node (or stored locally instead of adding to the MP packet). Processing proceeds to process block 542.

As determined in process block 539, if there is only a single operations data field, that being in an underlay header of the MP packet, then processing proceeds to process block 540; else processing proceeds to process block 542.

In process block 540, operations data is added to the underlay operations header evidencing the current network node. Processing proceeds to process block 542.

In process block 542, the particular MP packet is further processed by the underlay/overlay processing layers as required. In process block 544, the MP packet is sent from the network node into the network. Processing of the flow diagram of FIG. 5B is complete as indicated by process block 549.

Figure 5C:
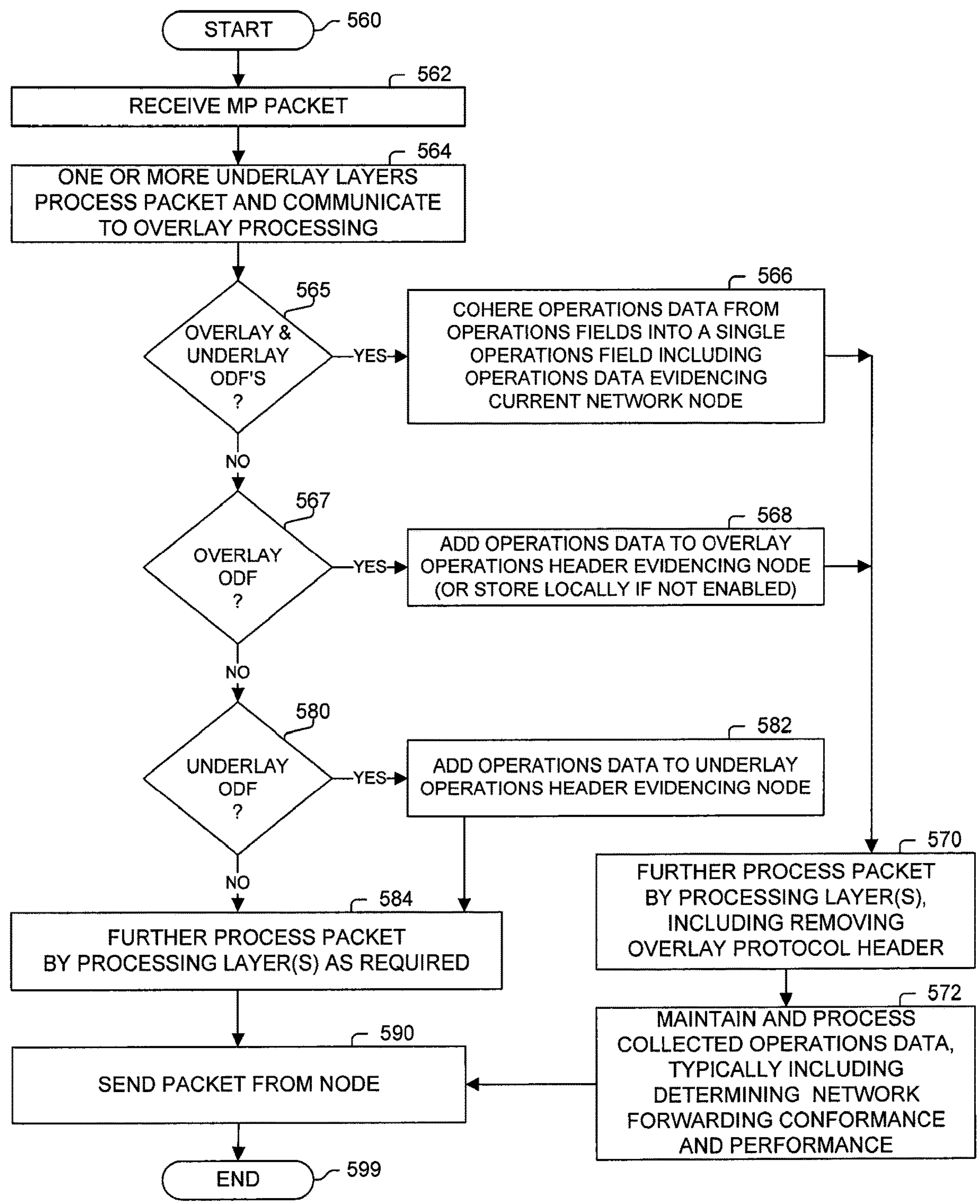
FIG. 5C illustrates a process according to one embodiment.

FIG. 5C illustrates a process performed in one embodiment by an egress edge node of an operations domain. Processing begins with process block 560. In process block 562, an MP packet is received by the network node. In process block 564, the received MP packet is processed by one or more underlay layers and communicated to overlay network processing.

As determined in process block 565, if the received MP packet includes both overlay and underlay operations data field in which corresponding operations data is to be collected, then processing proceeds to process block 566; else processing proceeds to process block 567.

In process block 566, operations data is cohered from operations fields into a single operations field of an overlay or underlay header (e.g., the highest overlay header) including operations data evidencing the current network node. Processing proceeds to process block 570.

As determined in process block 567, if there is only a single operations data field, that being in an overlay header of the MP packet, then processing proceeds to process block 568; else processing proceeds to process block 580.

In process block 568, operations data is added to overlay operations header evidencing the current network node (or stored locally instead of adding to the MP packet). Processing proceeds to process block 570.

In process block 570, the particular MP packet is further processed by the underlay/overlay processing layers as required, including removing the overlay protocol header. In process block 572, collected operations data is maintained and processed, typically including network forwarding conformance and performance. Processing proceeds to process block 590.

As determined in process block 580, if there is only a single operations data field, that being in an underlay header of the MP packet, then processing proceeds to process block 582; else processing proceeds to process block 584.

In process block 582, operations data is added to the underlay operations header evidencing the current network node. Processing proceeds to process block 584.

In process block 584, the particular MP packet is further processed by the underlay/overlay processing layers as required. Processing proceeds to process block 590.

In process block 590, the MP packet is sent from the network node into the network. Processing of the flow diagram of FIG. 5C is complete as indicated by process block 599.

In view of the many possible embodiments to which the principles of the disclosure may be applied, it will be appreciated that the embodiments and aspects thereof described herein with respect to the drawings/figures are only illustrative and should not be taken as limiting the scope of the disclosure. For example, and as would be apparent to one skilled in the art, many of the process block operations can be re-ordered to be performed before, after, or substantially concurrent with other operations. Also, many different forms of data structures could be used in various embodiments. The disclosure as described herein contemplates all such embodiments as may come within the scope of the following claims and equivalents thereof

What is claimed is:

1. A method, comprising:

receiving a particular multiple-protocol (MP) packet by a particular network node in a network, with the network including a plurality of network nodes that includes the particular network node, with the particular MP packet including a plurality of protocol headers, with each of the plurality of protocol headers including an operations data field, with the plurality of protocol headers including a first protocol header and a second protocol header, and with the operations data field in the first protocol header, but not in the second protocol header, includes first protocol ordered operations data;

cohering operations data from the operations data field of each of the plurality of protocol headers into the operations data field of the second protocol header resulting in the operations data field of the second protocol header including ordered MP operations data, with said ordered MP operations data evidencing operations data of each of the plurality of network nodes in a node traversal order taken by the particular MP packet among the plurality of network nodes, and with said ordered MP operations data including said first protocol ordered operations data; and sending, from the particular network node, the particular MP packet including said ordered MP operations data in the second protocol header.

2. The method of claim 1, comprising prior to said receiving the particular MP packet by the particular network node, a first network node sending the particular MP packet into the network after adding particular operations data evidencing operations data of the first network node to said first protocol ordered operations data; wherein the plurality of network nodes includes the first network node.

3. The method of claim 2, wherein the network comprises an overlay network that includes the particular network node; wherein the network comprises an underlay network that includes the first network node; wherein the first protocol header corresponds to the underlay network; and wherein the second protocol header corresponds to the overlay network.

4. The method of claim 1, comprising:

receiving a specific packet by an operations ingress edge network node, with said received particular packet not including the second protocol header, and with the first protocol header of said received particular packet not including the operations data field;

processing, by the operations ingress edge network node, the particular packet resulting in the particular MP packet, with said processing including adding the second protocol header and adding the operations data field to the first protocol header; and sending the particular MP packet into the network from the operations ingress edge network node.

5. The method of claim 4, wherein the operations data field in the second protocol header evidences operations data of the operations ingress edge network node when the particular MP packet is said sent from the operations ingress edge network node.

6. The method of claim 4, wherein the network comprises an overlay network that includes the operations ingress edge network node and the particular network node, with the second protocol header corresponding to the overlay network; wherein the network comprises an underlay network, with the first protocol header corresponding to the underlay network; and wherein the plurality of network nodes includes an underlay network node of the underlay network in the node traversal order taken by the particular MP packet among the plurality of network nodes.

7. The method of claim 6, wherein the first protocol header is an Internet Protocol version 6 (IPv6) Header, and the second protocol header is an IPv6 extension header.

8. The method of claim 7, wherein the second protocol header is a Segment Routing Header (SRv6).

9. The method of claim 6, wherein the underlay network node is not a node of the overlay network.

10. The method of claim 4, wherein the operations data field in the first protocol header evidences operations data of the operations ingress edge network node when the particular MP packet is said sent from the operations ingress edge network node.

11. The method of claim 1, comprising removing said first protocol ordered operations data from the operations data field of the first protocol header by the particular network node;

wherein when the particular MP packet is said sent from the particular network node, the operations data field of the first protocol header does not include said first protocol ordered operations data.

12. The method of claim 11, wherein the second protocol header includes information to identify whether an item in said the operations data field of the second protocol header was said cohered from the first protocol header.

13. The method of claim 1, wherein the plurality of protocol headers includes a third protocol header when the particular MP packet is said received by the particular network node, with the operations data field of the third protocol header including third protocol ordered operations data.

14. The method of claim 13, wherein when said sent from the particular network node: the operations data field of the first protocol header does not include said first protocol ordered operations data, and the operations data field of the third protocol header does not include said third protocol ordered operations data.

15. The method of claim 1, wherein the first protocol header corresponds to an underlay protocol, and the second protocol header corresponds to an overlay protocol.

16. The method of claim 15, wherein said first protocol ordered operations data evidences operations data of at least two of the plurality of network nodes.

17. The method of claim 15, wherein when the particular MP packet was said received by the particular network node: said first protocol ordered operations data evidences operations data of at least one of the plurality of network nodes and the operations data field of the second protocol header includes operations data of one or more of the plurality of network nodes.

18. The method of claim 1, wherein when the particular MP packet was said received by the particular network node: said first protocol ordered operations data evidences operations data of at least one of the plurality of network nodes and the operations data field of the second protocol header includes operations data of one or more of the plurality of network nodes.

19. The method of claim 1, wherein each of the plurality of protocol headers of the particular MP packet is outside a payload of the particular MP packet.

20. A particular network node in a network, comprising:

one or more processing elements;

memory;

one or more interfaces sending and receiving packets; and wherein the particular network node performs operations including:

receiving a particular multiple-protocol (MP) packet, with the network including a plurality of network nodes that includes the particular network node, with the particular MPH packet including a plurality of protocol headers, with each of the plurality of protocol headers including an operations data field, with the plurality of protocol headers including a first protocol header and a second protocol header, and with the operations data field of the first protocol header including first protocol ordered operations data;

cohering operations data from the operations data field of each of the plurality of protocol headers into the operations data field of the second protocol header resulting in the operations data field of the second protocol header including ordered MP operations data, and with said ordered MP operations data evidencing operations data of each of the plurality of network nodes in a node traversal order taken by the particular MP packet among the plurality of network nodes; and sending into the network the particular MP packet including said ordered MP operations data in the second protocol header.

* * * * *